United States Patent [19]
Papenhagen et al.

[11] Patent Number: 6,009,772
[45] Date of Patent: *Jan. 4, 2000

[54] MOTION TRANSMISSION DEVICE FOR CONTROLLING AN INTERNAL COMBUSTION ENGINE

[75] Inventors: Dieter Papenhagen, Waiblingen; Manfred Löchle, Stuttgart, both of Germany

[73] Assignee: DaimlerChrysler AG, Stuttgart, Germany

[ * ] Notice: Under 35 U.S.C. 154(b), the term of this patent shall be extended for 613 days.

[21] Appl. No.: 08/632,955

[22] Filed: Apr. 16, 1996

[30] Foreign Application Priority Data

Apr. 25, 1995 [DE] Germany .............. 195 15 107

[51] Int. Cl.⁷ ..................................... G05G 1/14
[52] U.S. Cl. .................. 74/513; 123/399; 123/400
[58] Field of Search .............. 74/585, 582, 513; 123/399, 400, 401

[56] References Cited

U.S. PATENT DOCUMENTS 3,927,657  12/1975  Mennesson ................ 74/513 X
3,943,907  3/1976   Kluth ........................ 74/513 X
4,869,220  9/1989   Imoehl ...................... 74/513 X
5,509,396  4/1996   Tamaki ....................... 123/400

Primary Examiner—Charles A. Marmor
Assistant Examiner—Saúl Rodriguez
Attorney, Agent, or Firm—Kluas J. Bach

[57] ABSTRACT

In a motion transmitting device for controlling an internal combustion engine by means of an accelerator pedal wherein a pedal position transmitter mounted on a support bracket includes a control lever mounted for rotation with a drive shaft extending from the pedal position transmitter, a return coil spring is disposed on the control lever coaxially with the drive shaft and has one end engaged with the control lever and the other with the support bracket and a pull member is attached to the control lever for imparting thereto the motion of the accelerator pedal wherein the pull member is so arranged that a pulling force is applied to the control lever along a line which is parallel to the direction of the force applied to the bracket by the coil spring but is in the opposite direction.

9 Claims, 3 Drawing Sheets

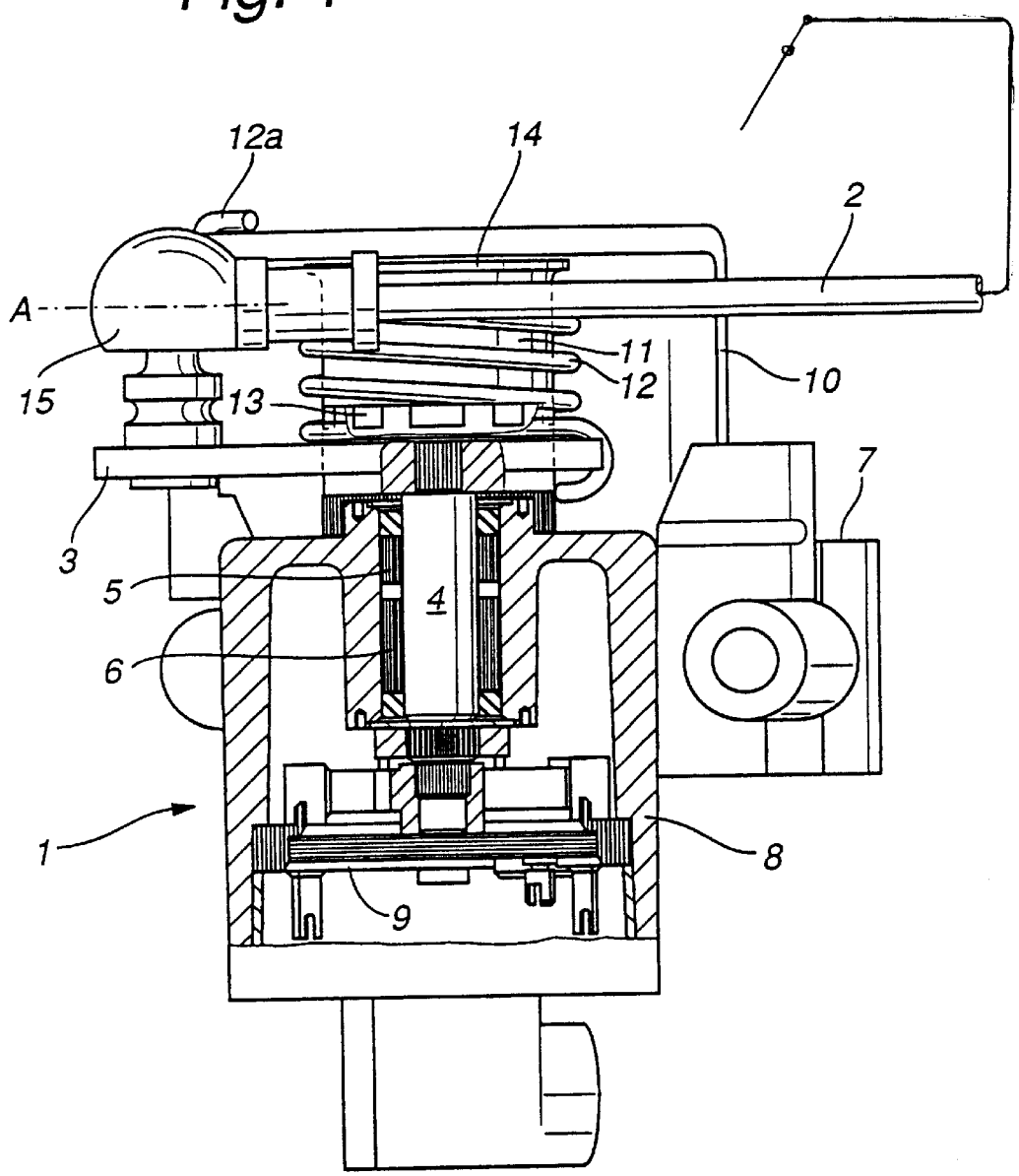
Fig. 1
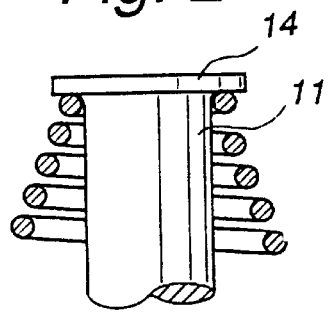
Fig. 2
Fig. 3

MOTION TRANSMISSION DEVICE FOR CONTROLLING AN INTERNAL COMBUSTION ENGINE

BACKGROUND OF THE INVENTION

The invention relates to a motion transmission device for controlling an internal combustion engine including an accelerator pedal from which a control motion is transmitted to an engine power output control device.

A motion transmission device of this kind is used in the vehicle series C220D, and C250D of the assignee of the present invention. In this device, a control lever is actuated by an accelerator pedal via a pull member and is rigidly connected to a drive shaft which is rotatably mounted in a pedal position transmitter housing. The control lever is movable against the force of a return spring secured on a support bracket for the transmitter housing.

In this embodiment, the mechanical mounting of the drive shaft in the transmitter housing is extremely sensitive to wear and can lead to malfunctions and hence to impairment of the accuracy of the pedal position transmission from an accelerator pedal to a power output control member (throttle member).

It is the principal object of the invention to improve the drive arrangement for the motion transmission device by a simple means in such a way that the drive shaft is subject to only little mechanical stress and wear so that it will operate reliably over a long period of time.

SUMMARY OF THE INVENTION

In a motion transmitting device for controlling an internal combustion engine by means of an accelerator pedal wherein a pedal position transmitter mounted on a support bracket includes a control lever mounted for rotation with a drive shaft extending from the pedal position transmitter housing, a return coil spring is disposed on the control lever coaxially with tie drive shaft and has one end engaged with the control lever and the other with the support bracket and a pull member is attached to the control lever for imparting thereto the motion of the accelerator pedal wherein the pull member is so arranged that a pulling force is applied to the control along a line which is parallel to the direction of the force applied to said bracket by said coil spring but is in the opposite direction.

The special arrangement and design of the return spring provides a drive means which keeps the transverse forces on the drive shaft extremely small since the forces effective by the spring retention arrangement at the control lever end and at the coupling point of the pull member with the control lever end are not at a large angle relative to one another but extend as much as possible parallel and in opposite directions so that the resultant force is near zero. The drive shaft bearings are therefore less subject to wear and transmission of the load signals by the pedal position transmitter remains precise over a long period of time.

The invention is illustrated in the drawings and a preferred embodiment is explained in greater detail below with reference to the drawings.

BRIEF DESCRIPTION OF THE DRAWINGS

FIG. 1 is an elevational view of a motion transmission device according to the invention with a cylindrical spring guiding element, FIG. 2 shows the cylindrical spring guiding element with a spiral return spring, FIG. 3 shows a conically designed spring guiding element with a cylindrical return spring.

DESCRIPTION OF A PREFERRED EMBODIMENT

Figure 4:
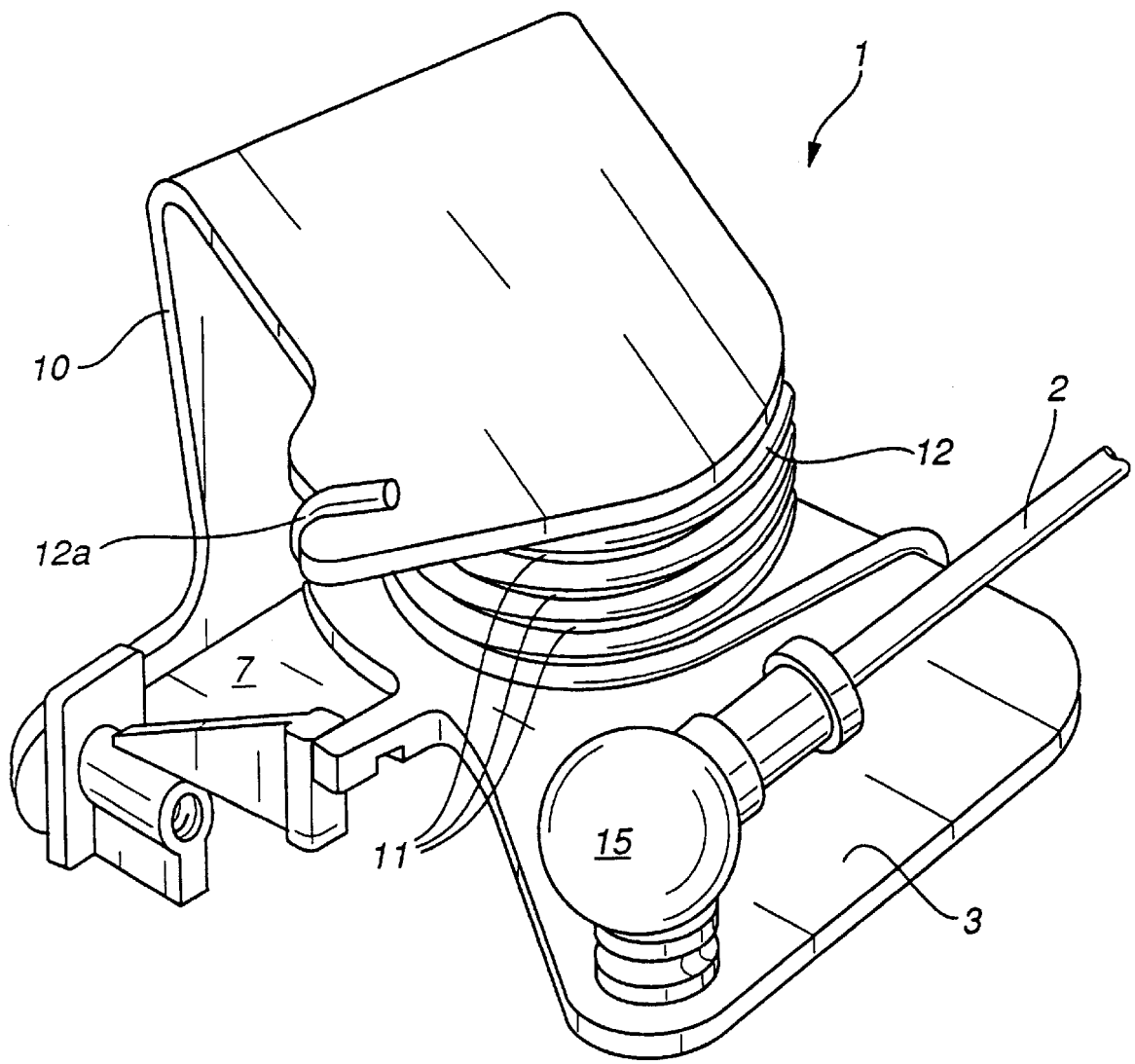
FIG. 4 is a perspective view of a motion transmission device.

To control an internal combustion engine, a motion transmission device 1 is provided to transmit the control movement of an accelerator pedal to a power output control member (not shown). The accelerator pedal acts via a pull member 2 on a control lever 3 which is rigidly connected to a drive shaft 4 (FIGS. 1 and 4).

The drive shaft 4 is rotatably supported by friction bearings 5, 6 of a transmitter housing 8, which is supported on a support bracket 7, and interacts with a pedal position transmitter 9 arranged in the transmitter housing 8 (FIG. 1). The pedal position transmitter 9 senses the gas pedal position and transmits a corresponding signal to an engine controller in a known manner and as provided for, for example, in connection with the vehicle types referred to earlier. The support bracket 7 has an upwardly projecting angled holding plate 10 which partially covers the control lever 3 (FIGS. 1,4).

Between the holding plate 10, which is in the form of a canopy, and the control lever 3, there is a cylindrical cup-like spring guide element 11, which consists of plastic. The spring guide element 11 is loosely surrounded by a return spring 12, which is a coil spring and for which the spring guide element 11 and a cylindrical projection 13 arranged coaxially with the drive shaft 4 and forming part of the controlling lever 3 serve as a guide structure.

At its end remote from the projection 13, the spring guide element 11 has a shoulder 14 for retaining the coil spring 12.

The floatingly mounted spring guide element 11 is secured in the axial direction by the canopy-like top of the holding plate 10.

The coil spring 12 is engaged at one end with the control lever 3 and at other end with the support bracket 10, the direction of the force acting on the support bracket by the spring retention arrangement 12a being as far as possible parallel to the direction of movement of the pull member 2. Since this results in an equilibrium of forces, the stress on the friction bearings 5, 6 of the drive shaft 4 is relatively small. The control movement of the accelerator pedal is not jerky (slip stick) but uniform, and the same is true for the rotatable parts of the pedal position transmitter 9.

The forces as generated by the spring engagement arrangement at the support bracket end relative to the coupling point 15 of the pull member 2 at the control lever end are also advantageous. The coupling point 15 and the spring engagement arrangement 12a are at approximately the same level, that is they are both disposed essentially in a plane A extending at least approximately transversely to the axis of the drive shaft 4. Because of this special relative arrangement essentially no shaft tilting moments are in effect so that the drive shaft 4 is even less subject to wear. the spring guide element 11 shown in FIG. 2 is not floatingly mounted, but is connected in torsionally rigid fashion to the control lever 3 for movement therewith. The coil spring is of spiral design and surrounds the cylindrical spring guide element 11 in such a way that the spring turn which is uppermost and has the smallest diameter rests against the shoulder 14 of the spring guide element 11.

The spring guide element 11 shown in FIG. 3 is of conical design and the coil spring is cylindrical, the uppermost spring turn resting against the section of the conical spring guide element which has the largest diameter.

In the case of a control movement of the accelerator pedal in the direction of full load, the embodiments shown in FIGS. 2 and 3 bring about a pedal force hysteresis build-up due to friction. When the accelerator pedal is in a position between part load and full load, this results in a release force of the accelerator pedal which is smaller than the actuating force of the accelerator pedal in the corresponding load position.

Figure 5:
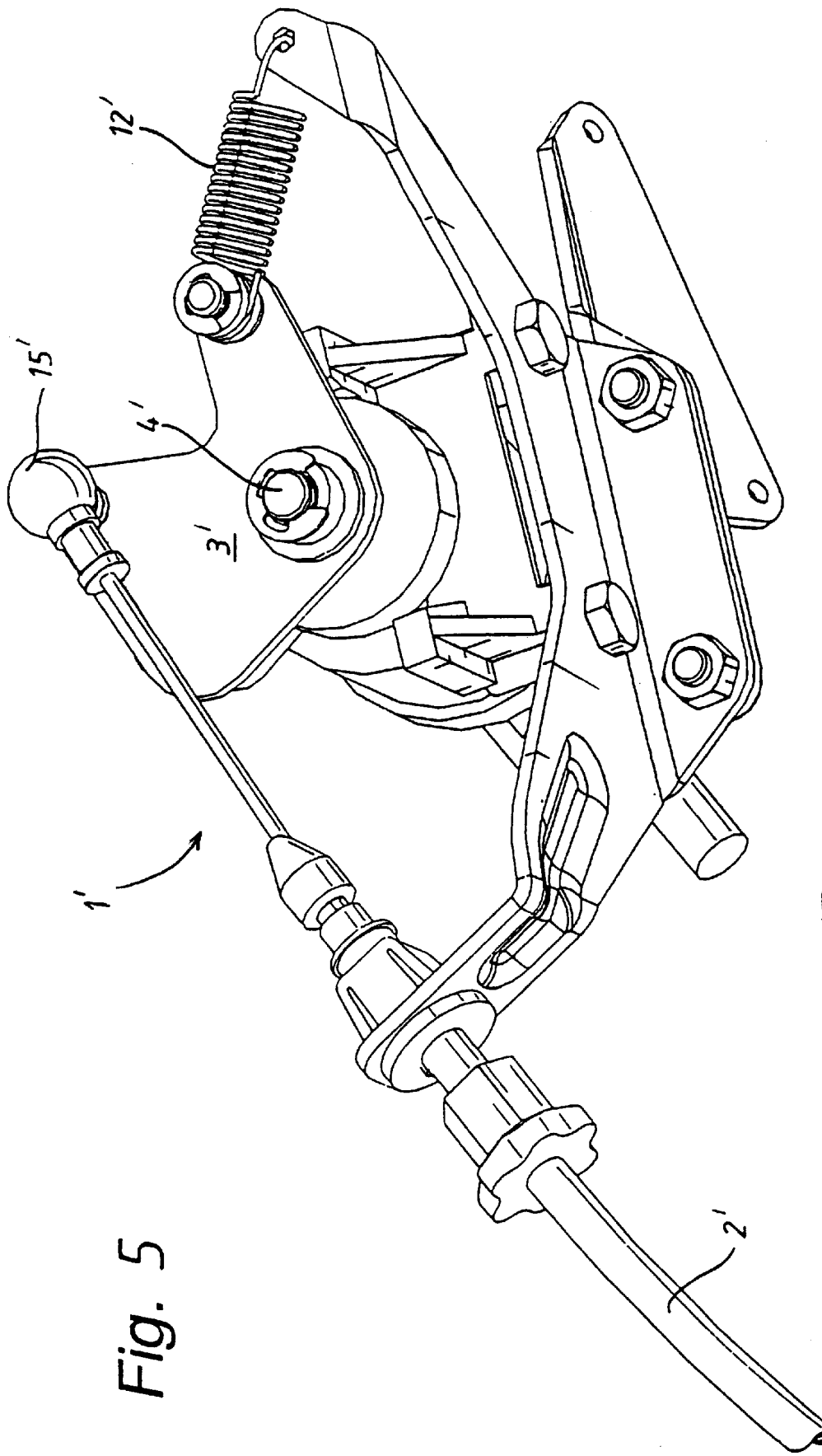
FIG. 5 is perspective view of a prior art motion transmission device.

FIG. 5 shows a prior art motion transmission device 1' in which the arrangement of the pull member coupling point 15' and of the return spring 12', and hence of its direction of action relative to the direction of action of the pull member 2', results in the generation of transverse forces on the control lever 3' which are effective on the drive shaft 4'. These forces lead to increased wear of the friction bearings for the drive shaft 4'.

What is claimed is:

1. A motion transmitting device for controlling an internal combustion engine by means of an accelerator pedal comprising: a support bracket, a pedal position transmitter housing mounted on said support bracket and having a drive shaft rotatably mounted in said transmitter housing with an end projecting therefrom, a control lever mounted on said drive shaft for rotation therewith, a pull member linking said control lever to said accelerator pedal for movement therewith, a return coil spring arranged on said control lever coaxially with said drive shaft and a return spring guide element extending from said control lever and being received within said return coil spring for guiding said return coil spring, said return coil spring having one end engaged with said control lever and the other end engaged with said support bracket at locations such that the force acting on said bracket by said return spring extends along a line which is parallel to the direction of the force applied to said control lever by said pull member but in opposite direction.

2. A device according to claim 1, wherein said control lever has a projection for guiding and supporting the adjacent end portion of said return coil spring.

3. A device according to claim 2, wherein said coil spring guide element is a cup-shaped solid plastic body which is provided with a shoulder at its end remote from said projection.

4. A device according to claim 1, wherein said support bracket has a canopy-like top end forming a holding plate which extends over said return coil spring guide element.

5. A device according to claim 4, wherein said return coil spring has said one end thereof engaged with said holding plate of said bracket, the engagement location between said return coil spring and said holding plate being at about the same level as the engagement location between said control lever and said pull member.

6. A device according to claim 4, wherein said spring guide element is floatingly supported between said control lever and said holding plate.

7. A device according to claim 1, wherein said spring guide element is mounted on said control lever for movement therewith.

8. A device according to claim 7, wherein said spring guide element is cylindrical and said return coil spring is conical having an end with a diameter smaller than that at the opposite end and smaller diameter end rests on said spring guide element.

9. A device according to claim 7, wherein said spring guide element is conical having a larger diameter end remote from said control lever and said return coil spring is cylindrical and has one end in engagement with the larger diameter end of said spring guide element.

* * * * *